United States Patent [19]

Harayama et al.

[11] Patent Number: 4,721,643
[45] Date of Patent: Jan. 26, 1988

[54] LAMINATED STRUCTURE FOR INTERIOR FINISHING MATERIALS, AND METHOD OF PRODUCTION THEREOF

[75] Inventors: Hiroshi Harayama, Kusatsu; Hideo Nishimura; Satoshi Ohmura, both of Toyota; Yutaka Yoshino; Rikizou Tanaka, both of Ohtsu; Fumimasa Kuno, Hasuda, all of Japan

[73] Assignees: Sekisui Kagaku Kogyo Kabushiki Kaisha, Osaka; Toyota Jidosha Kabushiki Kaisha, Aichi, both of Japan

[21] Appl. No.: 7,866

[22] Filed: Jan. 28, 1987

[30] Foreign Application Priority Data

Jan. 28, 1986 [JP] Japan ................................. 61-16190
Jan. 28, 1986 [JP] Japan ................................. 61-16191
Jan. 28, 1986 [JP] Japan ................................. 61-19192
Jan. 28, 1986 [JP] Japan ............................. 61-10742[u]
Jan. 28, 1986 [JP] Japan ............................. 61-10743[u]
Apr. 12, 1986 [JP] Japan ................................. 61-84799

[51] Int. Cl.$^4$ ........................ B32B 3/26; B32B 5/32; B32B 31/06; B32B 31/26
[52] U.S. Cl. ........................ 428/90; 156/182; 156/309.9; 428/95; 428/215; 428/246; 428/286; 428/316.6; 428/318.6; 428/319.7; 428/319.9
[58] Field of Search .............. 156/182, 309.9; 428/90, 428/95, 215, 246, 286, 316.6, 318.6, 319.7, 319.9

[56] References Cited

U.S. PATENT DOCUMENTS 3,515,612 6/1970 Rauhut ................................. 156/182
3,608,006 9/1971 Hosoda et al. ..................... 428/319.9
4,097,319 6/1978 Shimokawa et al. ............. 428/319.9
4,364,892 12/1982 Rehlen et al. ..................... 428/316.6

FOREIGN PATENT DOCUMENTS 57-20344 2/1982 Japan ................................. 428/319.9
2156735 10/1985 United Kingdom ............. 428/316.6

Primary Examiner—William J. Van Balen
Attorney, Agent, or Firm—Pollock, Vande Sande & Priddy

[57] ABSTRACT

A laminated structure comprising a laminated foamed sheet material composed of two cured foamed sheets each comprising a propylene-type polymer and an ethylene-type polymer and being laminated to each other through a substantially non-foamed or lowly foamed heat-fused layer, and non-foamed surface skin layers composed of a propylene-type polymer and laminated respectively to both surfaces of said laminated foamed sheet material, the ratio of the thickness Ts of each of said surface skin layer to the solid thickness Tf of each of the cured foamed sheets, Ts/Tf, being from 1 to 50, the thickness T1 of the heat-fused layer being 0.1 to 0.5 mm, and the thickness T1 being 1 to 25% of the thickness of each of the cured foamed sheets. The laminated structure can be produced by extrusion-laminating a non-foamed surface skin layer of a propylene-type polymer to one surface of each of two cured foamed sheets each comprising a propylene-type polymer and an ethylene-type polymer to thereby form two laminates, placing the two laminates such that the surfaces of the cured foamed sheets face each other, and melting and bonding the facing two surfaces to form a substantially non-foamed or lowly foamed heat-fused layer between the laminates.

13 Claims, 14 Drawing Figures

LAMINATED STRUCTURE FOR INTERIOR FINISHING MATERIALS, AND METHOD OF PRODUCTION THEREOF

This invention relates to a laminated structure for interior finishing materials, particularly automobile interior finishing materials such as a ceiling material, a door liner material and a trunk room mat, and to a method of production thereof.

Interior finishing materials of this kind, for example, molded ceilings of automobiles, are required to have rigidity, thermal resistance, deep-draw moldability, handling property, thermal insulation and further aesthetic beauty and soft feeling. To meet this requirement, it has been the previous practice to use a relatively hard material such as a resin felt, a plastic honeycomb and paperboard as a base and a padding material such as polyurethane foams and polyethylene foams and a surface skin such as a knitted fabric or a vinyl chloride leather-like material as a surface material.

For example, Japanese Laid-Open Utility Model Publication No. 148926/1980 discloses a five-layer laminated structure composed of a non-foamed propylene-type polymer sheet/polypropylene foam/non-foamed propylene-type polymer sheet as a base material and a polyurethane foam/a cloth or vinyl chloride leather-like material as a surface material, from which a ceiling of an automobile may be molded. The molded ceiling obtained from this laminated structure is complex in structure, and moreover the manufacturing process also becomes complex and results in an increased cost of production. Furthermore, since this laminated structure contains as the surface material the polyurethane foam which cannot be molded, a deep and sharp formative beauty cannot be obtained by heat molding, and the resulting ceiling does not have the desired aesthetic beauty.

It is an object of this invention to provide a laminated structure useful, particularly, as an automobile interior finishing material which is free from the aforesaid defects.

According to this invention, there is provided a laminated structure comprising a laminated foamed sheet material composed of two cured foamed sheets each comprising a propylene-type polymer and an ethylene-type polymer and being laminated to each other through a substantially non-foamed or lowly foamed heat-fused layer, and nonfoamed surface skin layers composed of a propylene-type polymer and laminated respectively to both surfaces of said laminated foamed sheet material, the ratio of the thickness Ts of each of said surface skin layer to the solid thickness Tf of each of the cured foamed sheets, Ts/Tf, being from 1 to 50, the thickness Tl of the heat-fused layer being 0.1 to 0.5 mm, and the thickness Tl being 1 to 25% of the thickness of each of the cured foamed sheets.

The term "cured foamed sheet", as used herein, denotes a sheet produced by mixing the propylene-type polymer and the ethylene-type polymer with a blowing agent and a curing agent (not required where curing is carried out by ionizing radiation) and if required a polyfunctional monomer, molding the mixture into a suitable shape such as a sheet, curing the shape by ionizing radiation (where no curing agent is added), or heating it at a temperature above the decomposition temperature of the curing agent and below the decomposition temperature of the blowing agent (where the curing agent is used), and further heating the cured product to a temperature above the decomposition temperature of the blowing agent, or performing the curing and the foaming simultaneously.

Each of the surface skin layers is a substantially non-foamed sheet of polypropylene or a copolymer of a major proportion of propylene with another monomer. Examples of the propylene-type polymer constituting the surface skin layer include alpha-olefin/propylene copolymers such as ethylene/propylene block copolymer, ethylene/propylene random copolymer and ethylene/butene/propylene copolymer. As required, inorganic or organic additives such as pigments, fire retardants, antistatic agents, antioxidants and fillers may be added to the propylene-type polymer. The preferred thickness of each of the surface skin layer is 0.1 to 1 mm. If it is too small, the mechanical strength of the resulting laminated structure is reduced. If it is too large, the resulting laminated structure increases in weight.

Examples of the propylene-type polymer constituting the curerd foamed sheet include alpha-olefin/propylene copolymers such as ethylene propylene random, block, or random-block copolymer and ethylene/butene/propylene copolymer. The alpha-olefin to be copolymerized is preferably such that the resulting copolymer has a melting point of 130° to 170° C. Preferably, the propylene-type polymer has a melt flow rate (MFR) of 0.1 to 50, especially 0.3 to 30.

Examples of the ethylene-type polymer constituting the cured foamed sheet include low-density polyethylene, medium-density polyethylene, high-density polyethylene, linear low-density polyethylene/ethylene/vinyl acetate copolymer and amorphous ethylene/propylene copolymers. These polymers may be used singly or in combination. Preferably, the ethylene-type polymer has an MFR of 0.1 to 50, especially 0.2 to 30.

When the amount of the propylene-type polymer in the cured foamed sheet increases, the resulting laminated structure has thermal resistance and increased stiffness, but on the other hand, is liable to break, particularly has low impact strength at low temperatures, and is excessively hard to reduce cushioning property. Furthermore, the laminated structure becomes difficult to heat mold in an extruder or the like, and since decomposition of the curing agent and the blowing agent occurs, good molded articles, and good foams, cannot be obtained. If, on the other hand, the amount of the propylene-type polymer decreases and the amount of the ethylene-type polymer increases, the resulting laminated structure has reduced thermal resistance and mechanical strength. Accordingly, the amount of the propylene-type polymer in the cured foamed sheet is preferably 10 to 80% by weight, more preferably 20 to 70% by weight.

Preferably, the cured foamed sheet has an expansion ratio of as high as 10 to 50, especially 20 to 40.

The thickness of the cured foamed sheet is preferably 1 to 5 mm. If it is too thin, the flexural strength of the laminated structure is reduced. Too large a thickness, on the other hand, causes economical disadvantage.

Now, the thicknesses of the individual layers of the laminated structurs will be described.

(A) The ratio of the thickness Ts of the non-foamed surface skin layer to the solid thickness Tf of the cured oamed sheet, Ts/Tf, is set at from 1 to 50. The solid thickness Tf denotes the thickness of the cured foamed sheet from which air is removed. Let the thickness of the cured foamed sheet be T and the expansion ratio be F, Tf can be defined as T/F.

The reason for limiting the Ts/Tf ratio as above will be described. In order to improve the moldability of the laminated structure, it is necessary to eliminate "necking", which is a phenomenon in which the surface skin layer becomes locally thin during molding to permit viewing through the thinned part or cause cracking. To eliminate necking, heat shrinkage of the laminated foamed sheet should be minimized.

If the ratio of the thickness Ts of the surface skin layer to the solid thickness Tf, Ts/Tf, is at least 1, the proportion of the surface layers in the laminated strucure becomes predominant, and the surface skin layers having little distortion reinforce the cured foamed sheet inherently having high heat shrinkage and the heat shrinkage of the laminated structure can be minimized.

If Ts/Tl becomes higher than 50, the proportion of the surface skin layers occupies most of the laminated structure, and it is difficult to obtain thermal insulation and soft feeling. If Ts/Tf is less than 1, the distortion of the cured foamed sheet undesirably acts to increase the heat shrinkage of the entire laminated structure. It is critical therefore that the Ts/Tf ratio should be limited to 1 to 50.

(B) The thickness Tl of the heat-fused layer between the two cured foamed sheet layers is limited to 0.1 to 0.5 mm and is set at 1 to 25% of the thickness of each of the cured foamed sheet before lamination by heat fusion. (The method of measuring Tl will be described hereinafter).

The reason for limiting the thickness Tl as above will be described.

The cured foamed sheets are laminated by fusing them by gas flames, etc. If in bonding the two cured foamed sheets, a lowly-foamed or substantially non-foamed heat-fused layer having a thickness of at least 0.1 mm is formed, the strain fixed during production of the cured foamed sheets can be removed, and the heat during fusion anneals the strain of the cured foamed sheets. Hence, the resulting laminated structure has good moldability.

If the thickness Tl is less tah 0.1 mm, it is difficult to form the heat-fused layer which is a substantially non-foamed layer formed by collapsing some of the cells on the surfaces of the foamed sheets. Furtermore, since heat fusion is incomplete, the two cured foamed sheets have poor adhesion and are liable to separate from each other.

If the thickness Ti is larger than 0.5 mm, the resulting laminated structure does not have satisfactory thermal insulation and soft feeling.

It is critical therefore that the thickness Tl should be from 0.1 to 0.5 mm. When this relation is expressed in terms of the relation between the expansion ratio and the thickness of the cured foamed sheet, it is important that the thickness Tl of the heat-fused layer should be 1 to 25% of the thickness of the cured foamed sheet.

The laminated structure of this invention is produced by extrusion-laminating the non-foamed surface skin layer composed of the propylene-type polymer on one surface of each of two cured foamed sheets each composed of the propylene-type polymer and the ethylene-type polymer, to form two laminates, placing the two laminates so that the other surfaces of the cured flamed sheets face each other, and melting and bonding the facing two surfaces to form a substantially non-foamed or lowly foamed heat-fused layer between the two laminates.

To increase the aesthetic beauty, soft feeling, etc. of the laminated structure of the invention as an interior finishing material, a decorative layer such as a knitted fabric, a nonwoven fabric or a sheet having implanted fibers layer may be bonded to the surface of one or both surface skin layers, or fibers may be implanted directly in the surface skin layers. It is also possible to form an embossed pattern such as a white-spotted pattern on the outside surface of one or both of the surface skin layers. The two foamed sheets forming the two-layer structure may have different expansion factors. In using such a laminated structure as an interior finishing material, an increased soft feeling can be obtained if the foamed sheet having a higher expansion ratio is positioned on the room side. The aesthetic beauty and soft feeling of such an interior finishing material can be increased by providing the aforesaid decorative layer or form an embossed pattern on the surface skin layer of the foamed sheet having a higher expansion ratio.

The use of a nonwoven fabric is preferred as a decorative outer layer. Since its requires thermal resistance during hot press molding, it is preferably made of a material having a higher melting point than the propylene-type polymer. Such a material may, for example, be a polyamide or polyester resin. In view of the soft feeling of the interior finishing material, the diameter of fibers of the non-woven fabric is preferably 20 to 150 microns, and the thickness of the nonwoven fabric is preferably 1 to 3 mm in view of its strength and cost. The nonwoven fabric may be produced by a dry or wet method.

Preferably, the decorative outer layer is bonded to the surface skin layer at the same time as the extrusion-lamination of the surface skin layer to the foamed sheet by utilizing the molten state of the surface skin layer. This obviates the use of an adhesive, simplifies the process and save resources.

Fibers may be implanted in the surface skin layer by, for example, coating an adhesive on the nonfoamed surface skin layer by a roll coater or the like, and applying short fibers on the coated layer by, for example, an electrostatic floc printing processor, and drying the product in a drying furnace. The adhesive used may be one which has good affinity for the propylene-type polymer and the short fibers and bonds them together firmly. Hot melt-type, emulsion-type and paste-type adhesives, for example, may be used.

Some embodiments of the laminated structure of this invention and the method for production thereof will be more specifically described below with reference to the accompanying drawings in which.

Figure 1:
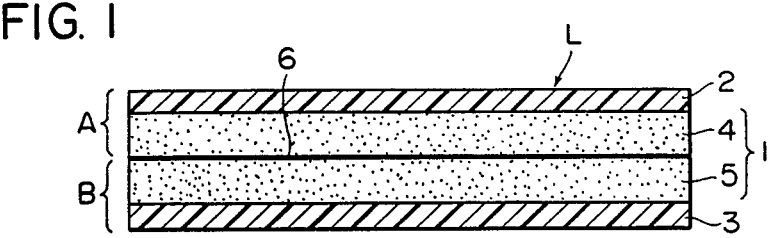
FIG. 1 is a sectional view showing the structure of one embodiment of the laminated structure of the invention.

With reference to FIG. 1, the laminated structure L of the invention consists of a laminated foamed sheet 1 composed of cured foamed sheets 4 and 5 melt-adhered to each other through a heat-fused layer 6, and non-foamed surface skin layers 2 and 3 laminated to both surfaces of the foamed sheet 1. Each of the cured foamed sheets 4 and 5 are composed of the propylene-type polymer and the ethylene-type polymer and contains a number of closed cells. Both of the non-foamed surfacer skin layers 2 and 3 are composed of propylene-type polymer.

The method of prouducing the laminated structure L shown in FIG. 1 will be described with reference to FIGS. 2 and 3.

Figure 2:
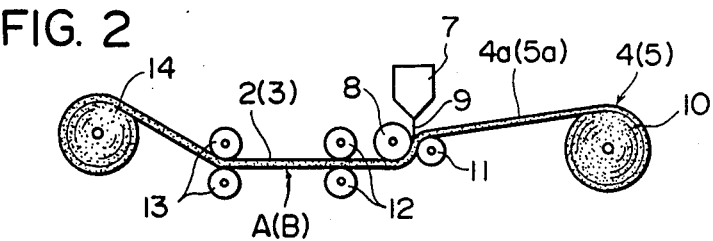
FIG. 2 is a schematic view showing the extrusion laminating step for production of the laminated structure shown in FIG. 1.

With reference to FIG. 2, the cured foamed sheet 4 (5) is withdrawn from a rolled foamed sheet 10 by a take-up device 13 via an extrusion-lamination device. The extrusion-lamination device is comprised of an extrusion die 7, a heat-bonding roll 8 and a back-up roll 11. A molten propylene-type polymer 9 extruded from the extrusion die 7 is supplied onto the foamed sheet 4 (5) and laminated to it by the heat bonding roll 8 and the back-up roll 11 to form a surface skin layer 2 (3). The resulting laminate A (B) is taken-up on a form 14 via a guide roll 12 and the take-up device 13. The method of producing the laminate A (B) as above is called the "extrusion lamination method" herein.

Figure 3:
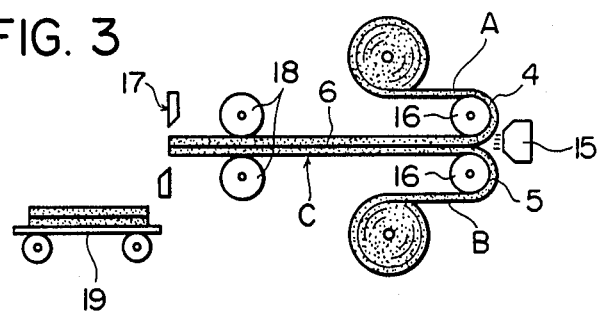
FIG. 3 is a schematic view showing a melt-bonding step for the production of the laminated structure shown in FIG. 1.

Then, as shown in FIG. 3, the extrusion-laminated sheets A and B are arranged with the surfaces of the cured foamed sheets 4 and 5 facing each other, and then bonded by bonding rolls 16 while the facing surfaces of the cured foamed sheets are melted by a heat-melting means 15 such as a gas flame or a strong infrared heater. As a result, a laminated structure C is formed. At this time, a substantially non-foamed or lowly foamed heat-fused layer 6 is formed in the bonded portion. The method of forming the laminated structure C from the two laminates A and B as above is called the "melt-bonding method" herein.

The laminated structure C is then cut to a predetermined size by a cutting device 17 to form final laminated products. In FIG. 3, the reference numeral 18 repesents a take-up device and 19, a carrier truck.

In the production of the laminated strucure of the invention, it is advantageous to laminate the surface skin layers 2 and 3 to the cured foamed sheets 4 and 5 by the extrusion-lamination method described above. This is for the following reason.

A hot roll laminating method (to be described hereinafter) and a three-layer simultaneous extrusion-laminating method (to be described hereinafter) may be considered as a method of laminating the surface skin layers 2 and 3 to the cured foamd sheets 4 and 5 in addition to the aforesaid extrusion-lamination method. The hot roll laminating method, however, has the defect that its molding ability is poor and the resulting fabricated article has warps or creases and somewhat poor adhesion between layers. The three layer simultaneous extrusion-laminating method gives a fabricated article being free from creases and having good adhesion, but its molding ability is not fully satisfactory and the fabricated article has some warps, and further that its requires a complex and large-sized apparatus.

In contrast the extrusion-lamination method has good moldability and gives fabricated article free from warps or creases and having good adhesion. This will be described in further detail hereinafter.

Figure 5:
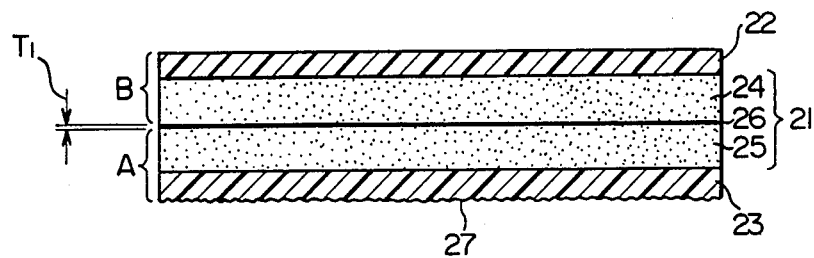
FIG. 5 is a sectional view of the structure of another embodiment of the laminated structure of the invention.

The laminated structure of the invention shown in FIG. 5 is the same as that shown in FIG. 1 except that an embossed pattern is formed on one of the surface skin layers. Cured foamed sheets 24 and 25 are melt-bonded through a heat-fused layer 26 to form a laminated foamed sheet 21. Non-foamed surface skin layers 22 and 23 are laminated to both surfaces of the foamed sheet 21, and an embossed pattern 27 is formed on the outside surface of the surface skin layer 23.

Figure 6:
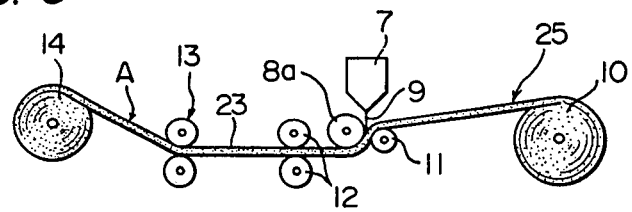
FIG. 6 is a schematic view showing an extrusion-lamination step for the production of the laminated structure shown in FIG. 5.

The laminated structure shown in FIG. 5 can be produced by the same method as that used for producing the laminated structure of FIG. 1 except that it comprises a step of forming the embossed pattern on one of the surface skin layers (FIG. 6). The apparatus shown in FIG. 6 is the same as that shown in FIG. 2 except that it has a heat bonding roll 8a having an embossed pattern on its surface is used instead of the heat bonding roll 8 shown in FIG. 2. In FIG. 6, the cured foamed sheet 25 is withdrawn from a rolled foamed sheet 10, and a molten propylene-type polymer 9 extruded from an extrusion die 7 is supplied to it and laminated to it by the heat bonding roll 8a having an embossed pattern and a back-up roll 11. As a result, a laminate A composed of the foamed sheet 25 and the surface skin layer 23 having an embossed pattern on its outside surface is formed. The laminate A is heat-bonded to the laminate B produced by using the apparatus of FIG. 2 by using the apparatus of FIG. 3 to form a final laminated structure.

It is preferred as shown above that the embossed pattern is formed at the same time as the extrusion-lamination of the non-foamed surface skin layer to the cured foamed sheet. The reason for this is as follows.

An embossed pattern may also be formed on the laminate by (1) a method comprising bonding a surface skin layer having formed thereon an embossed pattern in advance to the laminate, (2) a method comprising bonding the surface skin layer to the laminate and pressing the surface skin layer by an embossed roll during the bonding, or (3) a method comprising heating the finished laminate to a temperature near its melting point, and pressing it by an embossed roll.

According to the method (1), the surface layer having an embossed pattern is formed by holding the material between an embossed metallic roll and a hard rubber back-up roll. Hence, a notched part exists in the resulting surface skin layer, and this becomes one cause of defective molding (necking defect) during heat molding in a subsequent step.

In view of thermal resistance required of an interior finishing material as one application of the laminated structure of this invention (resistance to heat sagging in the case of a ceiling material, and resistance to heat deformation in the case of a door liner material), the heat distortion temperature of the inner cured foamed sheet is preferably set at a temperature slightly lower than that of the surface skin layer in order to reduce residual strains during heat molding. When the method (2) or (3) is used to provide an embossed pattern to such a laminated structure, the pattern will disappear readily unless the temperature of the surface skin layer is elevated above its melting point during the pattern provision. On the other hand, when the surface skin layer is heated above its melting point, there is a likelihood of damaging the cured foamed sheet.

In contrast, when the embossed pattern is provided at the same time as the extrusion-lamination, the above problem does not arise, and the surface skin layer bites into the cured foamed sheet to give a nearly uniform thickness.

Figure 10:
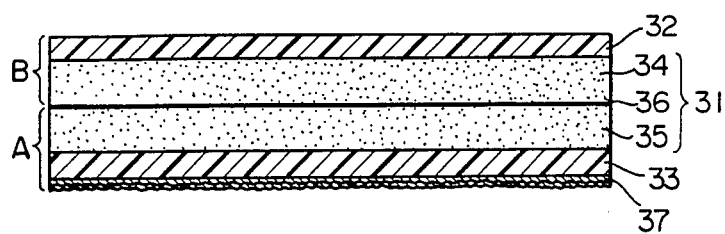
FIG. 10 is a sectional view of the structure of still another embodiment of the laminated structure of the invention.

The laminated structure of the invention shown in FIG. 10 is the same as that shown in FIG. 1 except that a decorative outside layer is formed on one of the surface skin layers. Cured foamed sheets 34 and 35 are melt-bonded via a heat-fused layer 36 to form a laminated foamed sheet 31. Non-foamed surface skin layers 32 and 33 are laminated to both surfaces of the foamed sheet 31, and a decorative outside layer 37 is laminated to the outside surface of the surface skin layer 33.

Figure 11:
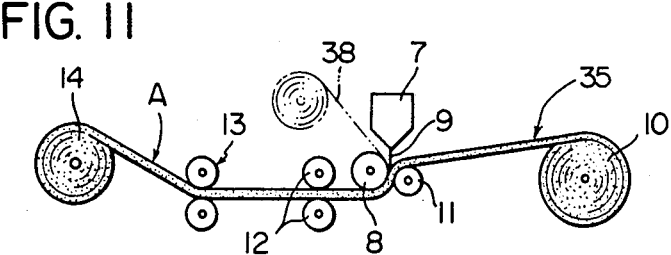
FIG. 11 is a schematic view showing an extrusion-lamination step for the production of the laminated structure of FIG. 10.

The laminated structure shown in FIG. 10 can be produced by the same method as used in producing the laminated structure of FIG. 1 except that it contains a step of laminating the decorative outside layer to one of the surface skin layers (FIG. 11). The apparatus shown in FIG. 11 is the same as that shown in FIG. 2 except that it comprises means for supplying a sheet 38 for the decorative outside layer to the bonding roll 8. With reference to FIG. 11, a cured foamed sheet 35 is withdrawn from a rolled foamed sheet 10, and a molten propylene-type resin 9 extruded from an extrusion die 7 is supplied to it. At the same time, the sheet 38 is inserted between the molten propylene-type polymer 9 and the bonding roll 8. The foamed sheet 35, the polymer 9 and the sheet 38 are bonded under heat by the bonding roll 8 and the back-up roll 11 to form a three-layer laminate A. The laminate A is heat-bonded to the laminate B produced by using the apparatus of FIG. 2 by using the apparatus of FIG. 3 to form a final laminated structure.

The sheet 38 for the decorative outside layer may, for example, be a knitted fabric, a nonwoven fabric or a resin sheet (e.g., a polypropylene sheet) having fibers implanted therein. The sheet 38 may be bonded to the propylene-type resin 9 without using an adhesive by utilizing the molten state of the polymer 9 at the time of extrusion lamination.

Figure 13:
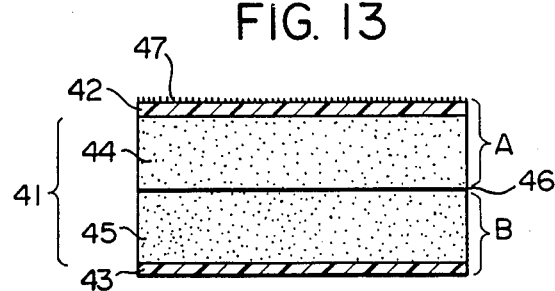
FIG. 13 is a sectional view showing the structure of yet another embodiment of the laminated structure of the invention.

The laminated structure of the invention shown in FIG. 13 is the same as that shown in FIG. 1 except that fibers are implanted in one of the surface skin layers. Cured foamed sheets 44 and 45 are melt-bonded through a heat-fused layer 46 to form a laminated foamed sheet 41. Non-foamed surface skin layers 42 and 43 are laminated to both surfaces of the laminated foamed sheet 41, and the outside surface of the surface skin layer 42 has a fiber-implanted layer 47.

Figure 14:
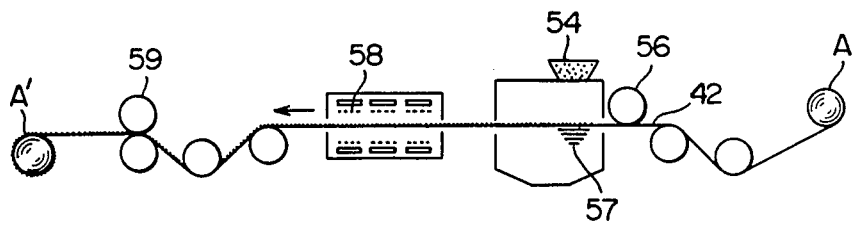
FIG. 14 is a schematic view showing a fiber implanting step for the production of the laminated structure shown in FIG. 13.

The laminated structure shown in FIG. 13 is produced as follows: A laminate A (B) composed of a foamed sheet 44 (45) is produced by using the apparatus shown in FIG. 2. Fibers are implanted in the laminate A. The fiber implantation is effected by, for example, coating a hot melt-type adhesive on the surface skin layer 42 of the travelling laminate A by a roll coater 56, applying short fibers 54 to the adhesive coating by means of an electrostatic floc printing processor 57, and passing the entire assembly through a drying furnace 58 to dry the adhesive. In FIG. 14, the reference numeral 59 represents a take-up roll, and A' is a laminate having fibers implanted therein which has been found up. The short fibers are, for example, made from nylon. The adhesive may also be an emulsion-type or paste-type adhesive which has good affinity for the propylene polymer and the short fibers and bonds them firmly.

Then, the laminate A' having fibers implanetted therein is melt-bonded to the laminate B having no implanted fibers by the apparatus shown in FIG. 3 to obtain a final laminate.

As stated above, the implantation of fibers is preferably done by using an adhesive after the formation of the laminate by extrusion lamination and before the step of melt-bonding them. Since in the fiber implanting step, the surface skin layer still has sufficient flexibility, a flat surface can be easily secured for application of the adhesive, and thus the adhesive can be coatd uniformly and the fibers can be implanted uniformly. Furthermore, in the melt-bonding step shown in FIG. 3, the facing surfaces of the cured foamed sheets are heated by the heating means and the bonding roll 16 itself is cool. Moreover, since the cured foamed sheets act as a thermal insulating agent for the fiber-implanted layer, the implanted fibers do not fall down.

The following examples illustrate the present invention more specifically.

EXAMPLE 1

A laminated structure of the type shown in FIG. 1 was produced by using the apparatus shown in FIGS. 2 and 3. Cured foamed sheets 4 and 5 are electron beam-cured foamed sheets having a closed cellular structure complosed of 40 parts by weight of high-density polyethylene (density 0.955 and MRF 6.0), 40 parts by weight of ethylene/butene/propylene copolymer (density 0.90, MFR 8.0, melting point 142° C.), and 20 parts by weight of ethylene/propylene block copolymer (density 0.90, MFR 5.0, melting point 165° C.). The sheets had an expansion ratio of 30, a thickness of 2.5 mm and a solid thickness Tf of 0.083 mm.

Non-foamed surface skin layers 2 and 3 were made of polypropylene having an MFR of 2.0 and a melting point of 163° C., and had a thickness Ts of 0.2 mm.

More specifically, by using the apparatus shown in FIG. 2, a material for the surface skin layers 2 (3) was fed into a single-screw extruder having a screw diameter of 90 mm, and extruded from an extrusion die 7 into a sheet at a resin temperaure of 240° C. Immediately then, while the sheet was applied to one surface 4a (5a) of the cured foamed sheet 4 (5) produced in advance, they were melt-bonded by a mirror-surface roll 8 and a rubber back-up roll 11 to laminate the non-foamed surface skin layer 2 (3) to form a laminate A (B). The speed of this extrusion lamination as 8 m/min., and the take-up speed for the laminate A (B) by a take-up device was 8 m/min.

Subsequently, by using the apparatus shown in FIG. 3, the laminates A and B having the surface skin layers 2 and 3 on one side are disposed so that the surfacs of the cured foamed sheets 4 and 5 faced each other. Then, a propane gas flame 15 was applied to the facing surfaces of the cured foamed sheets 4 and 5 to melt them, and immediately, they were bonded by bonding rolls 16 and a heat-fused layer 6 was simultaneously formed. The product was cooled to form a laminated structure C. At the time of melting, the surface temperature of the cured foamed sheets 4 and 5 was about 160° C., and the take-up speed of the laminated structure C was 6 m/min.

The laminated structure C was cut into rectangular pieces each having an area of about 2.2 m² and a long side/short side ratio of 1.4:1 to obtain final laminated products suitable as an interior finishing material. The heat-fused layer 6 formed under these laminating conditions had a thickness Tl of about 0.2 mm. The thickness of the laminated structure C was 5.5 mm because the cured foamed sheets 4 and 5 were secondarily foamed. The laminated structure had a weight of 502 g/m².

The thickness Tl of the heat-fused layer 6 was measured by the following methods.

The section of the laminated foamed sheet obtained by melt-bonding the two cured foamed sheets by using a gas flame was observed in the thickness direction by a magnifying glass having a scale. The thickness of the layer substantially free from foams as a result of heat-fusion of the surfaces of the foamed sheets was measured by the scale of the magnifying glass and defined as Tl.

COMPARATIVE EXAMPLE 1

Figure 4:
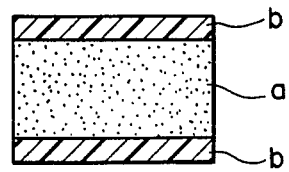
FIG. 4 is a sectional view of a laminated structure outside the scope of the invention shown for comparison.

A laminated structure of the type shown in FIG. 4 comprising a foamed sheet a and surface skin layers b laminated to both surfaces of the these a was produced by bonding and laminating the foamed sheet a and the surface skin layers b by a hot bonding roll (this method is referred to as the hot roll laminating method).

The foamed sheet a is an electron beam-cured foamed sheet having a closed cellular structure and the same chemical composition and expansion ratio as the foamed sheets 4 and 5 in Example 1, and had a thickness of 5.0 mm.

The non-foamed surface skin layers b were composed of the same polypropylene as in the surface skin layers 2 and 3 of Example 1 and had a thickness of 0.2 mm.

The temperature of the heat bonding roll was 150° C., and the take-up speed was 5.5 m/min.

COMPARATIVE EXAMPLE 2

A laminated structure of the type shown in FIG. 4 was produced by simultaneously extrusion-laminating surface skin layers b to both surfaces of a foamed sheet a (the three-layer simultaneous extrusion laminating method). In the extrusion lamination, the resin temperature was 240° C., and the take-up speed was 6 m/min.

The foamed sheet a and the surface skin layers b were the same as those used in Comparative Example 1.

Tests for properties (A) Test for moldability

The laminated structure of Example 1 (sample 1), the laminated structure of Comparative Example 1 (sample 2) and the laminated structure of Comparative Example 2 (sample 3), all of which had an area of 2.2 m², were each molded under heat by a hot press forming machine to obtain an interior ceiling material for automobiles. The state of the samples during heating and the rate of necking defect were examined. The heating conditions at this time were that the surface temperature of the sample was 140° to 145° C. by heat label displaying, and the heating time was 40 seconds. The results are shown in Table 1.

TABLE 1

|  | Sample 1 | Sample 2 | Sample 3 |
| --- | --- | --- | --- |
| State during heating | Uniform | Much waving | Waving |
| Rate of necking defect (%) | 0 | 70 | 30 |

The rate of necking defect in Table 1 was determined using 10 samples of the molded ceiling material in each run.

(B) Test for heat shrinkage

A standard line of a predetermined size was written in samples 1 to 3 at room temperature. Each of the samples was put in a Geer's aging tester set at a predetermined temperature, and heated for a certain period of time. It was then allowed to cool, and the size of the standard line was measured. The heat shrinkage (%) of the sample was calculated in accordance with the following equation.

$$\text{Heat shrinkage (\%)} = \frac{\text{Original size} - \text{size after heating and cooling}}{\text{Original size}} \times 100$$

The results are shown in Table 2.

TABLE 2

| Heating time (min.) | Sample 1 | | Sample 2 | | Sample 3 | |
| --- | --- | --- | --- | --- | --- | --- |
| 1 | MD | 0.2 | MD | 0.3 | MD | 0.3 |
|  | TD | 0.2 | TD | −0.2 | TD | 0.2 |
| 10 | MD | 0.3 | MD | 1.3 | MD | 0.8 |
|  | TD | 0.3 | TD | −0.3 | TD | 0.2 |

The various abbreviations shown in Table 2 have the following meanings.

MD: The machine direction of the laminated structure

TD: the direction at right angles to the machine direction

−: showing swelling

The heating temperature was 140° C. The measured values given in Table 2 are an average of 9 samples in each run.

As shown in Table 1, sample 1 did not show a waving phenomenon at the time of heat molding and the contact of it to the mold during presing was nearly uniform. There was no necking defect after the molding. Furthermore, as shown in Table 2, the heat shrinkage of sample 1 under temperature conditions approximating the heating conditions for molding was uniform both in MD and TD, and only slight.

In contrast, sample 2 showed much waving phenomenon during heat molding, and a rate of necking defect of as high as 70% after the molding. It was presumed that because of the waving phenomenon, the upper portions of the hills and the lower portions of the valleys in the waving of the sample contacted the die early and solidified early, and on the other hand, the non-contacted portions were elongated and caused the necking defect. Furthermore as shown in Table 2, sample 2 shrank in MD and was swollen slight in TD under the temperature conditions close to the heating conditions in the molding process. The heat shrinkages in MD and TD wre therefore non-uniform.

Sample 3 showed a waving phenomenon although to a lesser degree than in sample 2 during the heat molding and had a rate of necking defect of 30% after the molding. This is presumed to be due to the same reason as mentioned above with regard to sample 2. Furthermore, as shown in Table 3, the heat shrinkages of sample 2 were intermediate between the heat shrinkages of samples 1 and 2.

It has therefore been found that sample 1 (invention) had better moldability and heat shrinkage than samples 2 and 3 (comparison). The very low heat shrinkages of sample 1 are considered to be for the following reasons.

(1) The cured foamed sheets 4 and 5 generally have high heat shrinkages. But the thickness Ts of each of the non-foamed surface skin layers 2 and 3 is larger than the solid thickness Tf of each of the cured foamed sheets 4 and 5, and the surface skin layers 2 and 3 are predominant. Furthermore, the surface skin layers 2 and 3 formed by the extrusion-lamination method have little strains.

(2) When the surface skin layers 2 and 3 are laminated to the surfaces of the cured foamed sheets 4 and 5, the heating produces an annealing effect.

(3) Since the laminated foamed sheet 1 is formed by laying the cured foamed sheets 4 and 5 together, the heat-shrinkages of the sheets are averaged. The maximum value of the heat shrinkage of the sheet 1 is lower than the single cured foamed sheet 4 or 5.

(4) The heat-fused layer 6 having a thickness of at least 0.1 mm is formed in the boundary between the cured foamed sheets 4 and 5.

EXAMPLE 2

A laminated structure of the type shown in FIG. 5 was produced in the same way as in Example 1 except that instead of the bonding roll 8 shown in FIG. 2, the bonding roll 8a shown in FIG. 6 was used and an embossed pattern was formed on the surface skin layer of laminate A. The product is designated as sample 4.

COMPARATIVE EXAMPLE 3

Figure 7:
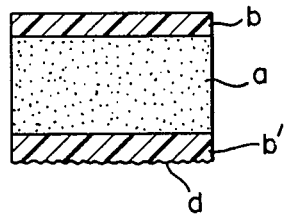
FIG. 7 is a sectional view of another laminated structure outside the scope of the invention shown for comparison.

A laminated structure composed of foamed sheet a and non-foamed surface skin layers b and b' on both sides thereof as shown in FIG. 7 was produced by the same hot roll laminating method as in Comparative Example 1 except that an embossed pattern was formed on the surface skin layer b' before the surface skin layer b' was bonded to the foamed sheet a. The product is designated as sample 5.

COMPARATIVE EXAMPLE 4

A laminated structure composed of a foamed sheet a and non-foamed layers b and b' on both sides thereof as shown in FIG. 7 was produced by the same three layer simultaneous extrusion laminating method as in Comparative Example 2 except that an embossed pattern was formed on the surface skin layer b' at the time of extrusion lamination. The product is designated as sample 6.

Test for Properties (A) Test for moldability

Samples 4 to 6, each having an area of 2.2 m², were heat-molded by a hot press molding machine to form ceiling materials for automobiles. The states of the samples during heating, and the rates of necking defect and embossing disappearance after the molding wer examined. The heating conditions at this time were that the surface temperature of the sample was 140° to 145° C. by heat label displaying, and the heating time was 40 seconds. The results are shown in Table 3.

TABLE 3

|  | Sample 4 | Sample 5 | Sample 6 |
|---|---|---|---|
| State during heating | Uniform | Much waving | Waving |
| Rate of necking defect (%) | 0 | 70 | 30 |
| Rate of embossing disappearance (%) | 0 | 90 | 40 |

The rates of necking shown in Table 3 show the rates of necking in 10 molded ceiling materials. The embossing disappearance is the phenomenon of disappearance of the embossed pattern by heat molding. It is presumed that the embossed pattern does not disappear only by heat, and it is an early stage phenomenon of necking.

(B) Comparison of embossed patterns after heat molding

After the heat moldilng, the cross sections of the embossed pattern portions of samples 4 to 6 were observed. The results of observation were as follows.

Figure 8:
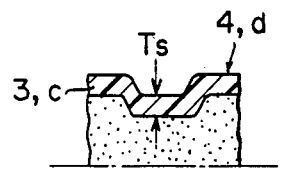
FIG. 8 is a partial sectional view of the laminated structure of FIG. 5 taken after the heat molding.

Samples 4 and 6: As shown in FIG. 8, the thickness Ts of the surface skin layer b' was about 200 microns all over and nearly uniform.

Figure 9:
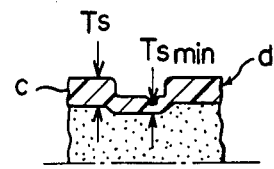
FIG. 9 is a partial sectional view of the laminated structure of FIG. 7 taken after the heat molding.

Sample 5: As shown in FIG. 9, the thickness Ts of the flat part of the surface skin layer b' was about 250 microns, and its depressed part had a thickness Ts min. of 135 microns.

As shown in Table 3, no waving phenomenon occurred in sample 4 during the heat molding, and the contact of the sample with the die during the press molding was nearly uniform. After the molding, no necking defect existed, nor was there a disappearance of the embossed pattern. Thus, a good embossed pattern was formed in sample 4. The surface skin layer having the embossed pattern formed on it had a nearly uniform thickness Ts and did not constitute a starting site of necking. This is one reason why necking did not occur in this sample.

Sample 5, on the other hand, showed much waving during the heat molding as shown in Table 3, and the rate of necking defect was as high as 70%. It was presumed that because of the waving phenomenon, the upper portions of the hills and the lower portions of the valleys in the waving of the sample contacted the die early and solidified early, and on the other hand, the non-contacted portions were elongated and caused the necking defect. The ratio of embossing disappearance was as high as 90%, and most of the embossed pattern disappeared.

Sample 6 showed a waving phenomenon although not as much as in sample 5 during the heat molding as shown in Table 3, and had a fairly high rate of necking defect of 30%. This is presumably for the same reason as in the case of sample 5. The rate of embossing disappearance was as high as 40%.

EXAMPLE 3

Using an apparatus of the type shown in FIG. 11, the same raw material for surface skin layers composed of polypropylene as used in Example 1 was fed into a single screw extruder having a screw diameter of 90 mm and extruded at a resin temperature of 250° C. from an extrusion die 7 into a sheet form. Immediately then, while the sheet was placed along one surface of the same cured foamed sheet 35 as used in Example 1, they were bonded by a metallic mirror-surface roll 8 and a rubber back-up roll 11 to laminate a surface skin layer of the polypropylene sheet to the foamed sheet. At the same time, a decorative outside layer sheet 38 was applied to the surface skin layer and bonded to it by the mirror-surface roll 8, followed by cooling. Thus, a three-layer laminate A was produced.

The decorative outside layer sheet 38 was a non-woven fabric produced by a dry method from polyester fibers having a diameter of 30 microns and a length of 70 mm using ethylene/vinyl chloride copolymer as a binder. It had a thickness of 1.3 mm and a basis weight of 200 g/m².

The speed of extrusion lamination at this time was 8 m/min. The mirror-surface roll 8 had an outside diameter of 400 mm and was kept at a temperature of 50° C. The clearance between rolls 8 and 11 was 1.6 mm (compression ratio: 0.7). The rolls 8 and 11 made linear contact with each other under a contact pressure of about 2 kg/cm². The rate of take-up of the laminate A by the take-up device 13 was 6 m/min.

A laminate B composed of the cured foamed sheet and the non-foamed surface skin layer was produced by the same method as above except that the decorative outside layer was not used.

Using the apparatus shown in FIG. 3, the laminates A and B were arranged with the cured foamed sheet surfaces faced each other. The facing surfaces of the cured foamed sheets were melted by a propane gas flame 15, and immediately then bonded by bonding rolls 16. Simultaneously, a heat-fused layer 6 formed. The bonded structure was cooled to form a laminated structure C. At the time of melting, the surface temperature of the cured foamed sheets was about 160° C. The clearance between the rolls 16 was 2.0 mm, and the pressure between them was about 3 kg/cm², and the take-up speed of the laminated structure was 6 m/min.

Then, the laminated structure C was cut into rectangular pieces each having an area of about 2 m² and a long side/short side ratio of 1.3:1 to obtain final laminated products suitable as an automobile interior finishing material. The heat-fused layer 6 formed under these laminating conditions had a thickness Tl of about 0.2 mm. The thickness Ts of the surface skin layer was 0.2 mm. The thickness of the laminated structure C was 6.8 mm because the cured foamed sheets were secondarily foamed. The laminated structure had a weight of 700 g/m². Thus, it had a very light weight and was beautiful. The product is designated as sample 7.

COMPARATIVE EXAMPLE 5

Figure 12:
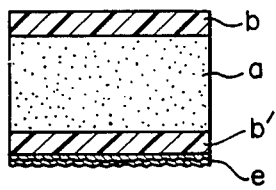
FIG. 12 is a sectional view of still another laminated structure outside the invention shown for comparison.

A laminated structure composed of a foamed sheet a, non-foamed surface skin layers b and b' laminated to both sides of the sheet a, and a decorative outside layer e formed on one skin layer b' as shown in FIG. 12 was produced as follows by a hot roll laminating method. Specifically, the foamed sheet a and surface skin layers b and b' produced in advance were bonded by two hot bonding rolls to form a three-layer laminated sheet. The decorative outside layer sheet having a hot-melt adhesive film applied thereto was applied to the laminated sheet by hot press molding.

The foamed sheet a had the same composition and expansion ratio as that used in Example 3, and a thickness of 5.0 mm. The surface skin layers and the decorative outside layer were the same as those used in Example 3. The resulting product is designated as sample 8.

Test for properties

Samples 7 and 8 each having an area of 2 m² were each heat-molded by a hot press forming machine to obtain an interior ceiling material for automobiles. The state of the samples during heating and the rate of necking defect were examined. The heating conditions at this time were that the surface temperature of the sample was 140° to 145° C. by heat label displaying, and the heating time was 40 seconds. The results are shown in Table 4.

TABLE 4

|  | Sample 7 | Sample 8 |
| --- | --- | --- |
| State during heating | Uniform | Much waving |
| Rate of necking defect (%) | 0 | 40 |

The rate of necking defect in Table 4 was determined using ten samples of the molded ceiling material in each run.

As shown in Table 4, sample 7 did not show a waving phenomenon at the time of heat molding and the contact of it to the mold during pressing was nearly uniform. There was no necking defect after the molding.

In contrast, sample 8 showed much waving phenomenon during heat molding, and had a rate of necking defect of as high as 40% after the molding. It was presumed that because of the waving phenomenon, the upper portions of the hills and the lower portions of the valleys in the waving of the sample contacted the die early and solidified early, and on the other hand, the non-contacted portions were elongated and caused the necking defect.

EXAMPLE 4

A starting material for surface skin layers which consisted of polypropylene having an MFR of 2.0 and a melting point of 163° C. as a main component and a fire retardant, an ultraviolet absorber, an antistatic agent and a pigment was fed into a single screw extruder having a screw diameter of 90 mm and extruded from an extrusion die 7 at a resin temperature of 235° C. at the die head portion to form a sheet. Immediately after leaving the die, the sheet was laid along one surface of a previously produced cured foamed sheet an bonded by a metallic mirror-surface roll 8 and a rubber back-up roll 11 to form a non-foamed surface skin layer.

The cured foamed sheet was an electron beam-cured foamed sheet having a closed cellular structure and composed of 40 parts by weight of high-density polyethylene (density 0.955, MFR 6.0), 40 parts of ethylene/butene/polypropylene copolymer (density 0.90, MFR 8.0, melting point 142° C.), 20 parts by weight of ethylene/propylene/block copolymer (density 0.90, MFR 5.0, melting point 165° C.), a blowing agent, a curing promotor and a heat stabilizer. It had an expansion ratio of 30, a thickness of 2.5 mm and a solid thickness Tf of 0.083 mm.

The mirror-surface roll 8 was kept at 50° C., and the linear pressure between the rolls was adjusted to 2 kg/cm$^2$.

To laminates A and B obtained by bonding were taken up at a rate of 6 m/min., and wound up on a wind-up roll 14.

Using the apparatus shown in FIG. 14, a hot-melt adhesive was coated on the surface skin layer of the laminate by a roll coater 56 at a rate of 200 g/m$^2$, and short fibers 54 were implanted on the surface skin layer by using an electrostatic floc printing processor 57. The laminate A was then passed through a drying furnace 58 at 90° C. to dry it, and taken up by a take-up roll 59 to obtain a laminate A' having implanted fibers in a rolled form. The surface of the non-foamed surface skin layer had been treated with a primer in order to improve its adhesion.

Subsequently, in the apparatus shown in FIG. 3, the laminate A' and the laminate B having no implanted fibers were placed so that the surfaces of the cured foamed sheets faced each other. Then, the facing surfaces of the cured foamed sheets were melted by a propane gas flame 15 and immediately then bonded by bonding rolls 16 to effect bonding and simultaneously form a heat-fused layer 6. The laminated structure was taken-up by a take-up roll 18. The temperature of the bonding rolls 16 was 18° C.

The surface temperature of the cured foamed sheets at the time of melting was examined by applying a heat label and cutting the resulting laminated structure open. It was found to be about 165° C. The take-up speed of the laminated structure was 6 m/min. The clearance between the bonding rolls 16 was set at 3.0 mm, and the pressure between the bonding rolls was 3 kg/cm$^2$.

The laminated structure C was cut into rectangular pieces each having an area of about 2 m$^2$ and a long side/short side ratio of 1.3:1 to obtain final laminated products suitable as an automobile interior finishing material. The heat-fused layer 6 formed under these laminating conditions had a thickness Tl of about 0.2 mm. The thickness Ts of the surface skin layer was 0.2 mm. The laminated structure had a weight of 650 g/m$^2$, and was very light and beautiful.

EXAMPLE 5

Using the apparatus shown in FIG. 2, a starting material for surface skin layers consisting of ethylene/propylene block copolymer, a fire retardant, an antistatic agent and an antioxidant was melt-extruded onto, and bonded to, the surface of a cured foamed sheet 4 which had an expansion ratio of 20, a thickness of 2.5 mm and a closed cellular structure and composed of 40 parts by weight of high-density polyethylene (density 0.955, MFR 6.0), 40 parts by weight of ethylene/butene/propylene copolymer (density 0.90, MFR 8.0) and 20 parts of ethylene/propylene block copolymer (density 0.90, MFR 5.0) to form a surface skin layer 2 having a thickness of 0.2 mm (laminate B).

Using the apparatus shown in FIG. 6, the same surface skin layer 3 as the surface skin layer 2 was formed on the same cured foamed sheet 5 as the cured foamed sheet 4 except having an expansion ratio of 35, and an embossed pattern 27 was formed in the surface skin layer 3 by an embossing roll 8a (laminate A).

Using the apparatus shown in FIG. 3, the laminates A and B were heat-bonded to obtain a laminated structure having a heat-fused layer as an interlayer.

In the resulting laminated structure, the non-foamed surface skin layer having an embossed pattern was laminated to the cured foamed sheet having a high expansion ratio. When the laminated structure is used as an automobile interior material with its embossed pattern side facing indoors, a soft touch and an aesthetic beauty indoors can be ensured while it retains sufficient rigidity and thermal resistance.

EXAMPLE 6

Using the apparatus shown in FIG. 2, a starting material for surface skin layers consisting of ethylene/propylene block copolymer, a fire retardant, an antistatic agent and an antioxidant was melt-extruded onto, and bonded to, the surface of a cured foamed sheet 4 which had an expansion ratio of 20, a thickness of 2.5 mm and a closed cellular structure and composed of 40 parts by weight of high-density polyethylene (density 0.955, MFR 6.0), 40 parts by weight of ethylene/butene/propylene copolymer (density 0.90, MFR 8.0) and 20 parts of ethylene/propylene block copolymer (density 0.90, MFR 5.0) to form a surface skin layer 2 having a thickness of 0.2 mm (laminate B).

Using the apparatus of FIG. 2, the same surface skin layer 3 as the surface skin layer 2 was formed on the same cured foamed sheet 5 as the cured foamed sheet 4 except having an expansion ratio of 35. Then, by the apparatus of FIG. 14, a fiber implanted layer 47 was formed on the surface skin layer 3 (laminate A).

The laminates A and B were heat-bonded by the apparatus of FIG. 3 to obtain a laminated structure having a heat-fused layer as an interlayer.

In the resulting laminated structure, the non-foamed surface skin layer having a fiber-implanted layer was laminated to the cured foamed sheet having a high expansion ratio. When the laminated structure is used as an automobile interior finishing material with its fiber implanted layer facing indoors, a soft touch and an aesthetic beauty indoors can be ensured while it retains sufficient rigidity and thermal resistance.

As is clearly seen from the foregoing statement, the laminated structures of this invention have the various excellent advantages described below, and because of these advantages, they are very useful as automobile interior materals, particularly large-sized interior materials such as ceilings, door liners, trunk room mats.

The laminated foamed sheet is formed by laminating two cured foamed sheets composed of a propylene-type polymer and an ethylene-type polymer, and non-foamed surface skin layers composed of a propylene-type polymer are laminated to both surfaces of the laminated foamed sheet. Hence, the laminated structure of this invention has a simple structure, and the manufacturing process therefor is simplified. The cost of production can therefore be decreased, and inexpensive automobile interior materials can be provided.

The laminated structure of the invention is light in weight and had excellent impact strength, rigidity, thermal resistance, draw moldability, handling property, thermal insulation and soundproof property.

Since the laminated structure of the invention has good moldability, a deep and sharp formative aesthetic beauty can be easily obtained by heat molding, and the resulting laminated structure can meet the aesthetic beauty and soft feeling desired of interior materials.

Since the ratio of the thickness Ts of the non-foamed surface skin layer to the solid thickness Tf of the cured foamed sheet is set at 1 to 50, the proportion of the surface layer in the laminated structure is predominant, and the cured foamed sheet inherent having high thermal shrinkage is reinforced by the surface skin layers having reduced strain. Accordingly, the thermal shrinkage of the laminated structure is minimized. This eliminates "necking", and ensures good moldability of the laminated structure. In addition, since the thickness of the surface skin layer is the smallest required, the thermal insulation and soft feeling of the laminated structure as a whole are sufficiently ensured.

Furthermore, since the thickness Tl of the heat-fused layer is adjusted to 0.1 to 0.5 mm and set at 1 to 25% of the thickness of the cured foamed sheet, the strain fixed during the production of the cured foamed sheet is suppressed, and good moldability at the time of laminating the cured foamed sheets to each other can be ensured. In addition, since the thickness of the heat-fused layer is the smallest required, the thermal insulation and soft feeling of the laminated structure as a whole are fully ensured.

The laminated structure of the invention has required rigidity and is sufficiently soft. Hence, when it is used as an interior material and directly bonded to a substrate without using a padding material, the properties required of it can be fully satisfied.

By forming an embossed pattern on at least one of the surface skin layers of the laminated structure of the invention, or providing an outside layer of a knitted or non-woven fabric on at least one of the surface skin layers, or implanting fibers thereon, the aesthetic beauty and soft feeling as an interior material can be further increased.

Furthermore, by using two cured foamed sheets having different expansion ratios and providing the aforesaid embossed pattern, knitted fabric layer, nonwoven fabric layer or fiber-implanted layer as described above on the surface skin layer bonded to the cured foamed sheet having a higher expansion ratio, soft touch as an interior material can be obtained while retaining sufficient rigidity and heat resistance in the entire laminated structure.

The method of producing the laminated structure of this invention has various advantages, among which are:

(1) Excellent moldability and adhesion can be obtained by using the extrusion laminating method. Creasing or warping of the molded articles can be prevented, and a nearly strain-free surface layer can be formed on the surface of the cured foamed sheet.

(2) The heating used at the time of laminating the surface skin layer onto the surface of the cured foamed sheet gives an annealing effect to the foamed sheet.

(3) By laminating two cured foamed sheets, the heat shrinkage of the bonded laminated foamed sheet is averaged throughout.

(4) By forming a heat-fused layer in the boundary of the cured foamed sheets, the strain fixed at the time of producing the cured foamed sheets is suppressed.

Because of these advantages, the thermal shrinkage of the laminated structure during heat molding can be maintained very low, and stable and accurate moldability can be obtained.

The decorative outside layer can be provided on the surface of the surface skin layer in accordance with this invention utilizing the molten state of the surface layer in the extrusion laminating step for laminating the surface skin layer to the foamed sheet. Hence, no adhesive is required, and the process can be simplified and the cost of the materials, curtailed. In particular, when the non-woven fabric is bonded to the surface layer, the molten resin of the surface skin layer comes into the fibers of the non-woven fabric and solidified. Thus, a sufficiently high bond strength can be achieved by an "anchor effect".

What is claimed is:

1. A laminated structure comprising a laminated foamed sheet material composed of two cured foamed sheets each comprising a propylene-type polymer and an ethylene-type polymer and being laminated to each other through a substantially non-foamed or lowly foamed heat-fused layer, and non-foamed surface skin layers composed of a propylene-type polymer and laminated respectively to both surfaces of said laminated foamed sheet material, the ratio of the thickness Ts of each of said surface skin layer to the solid thickness Tf of each of the cured foamed sheets, Ts/Tf, being from 1 to 50, the thickness Tl of the heat-fused layer being 0.1 to 0.5 mm, and the thickness Tl being 1 to 25% of the thickness of each of the cured foamed sheets.

2. The laminated structure of claim 1 wherein the expansion ratios of the two cured foamed sheets are equal to each other.

3. The laminated structure of claim 1 wherein the expansion ratios of the two cured foamed sheets are different from each other.

4. The laminated structure of claim 1 wherein an embossed pattern is formed on the outside surface of at least one of the surface skin layers.

5. The laminated structure of claim 1 wherein a decorative outside layer is bonded to the outside surface of at least one of the surface skin layers.

6. The laminated structure of claim 5 wherein the decorative outside layer is a knitted fabric, a non-woven fabric or a resin sheet having fibers implanted therein.

7. The laminated structure of claim 1 wherein fibers are implanted in the outside surface of at least one of the surface skin layers.

8. A method of producing the laminated structure according to claim 1, which comprises extrusion-laminating a non-foamed surface skin layer of a propylene-type polymer to one surface of each of two cured foamed sheets each comprising a propylene-type polymer and an ethylene-type polymer to thereby form two laminates, placing the two laminates such that the surfaces of the cured foamed sheets face each other, and melting and bonding the facing two surfaces to form a substantially non-foamed or lowly foamed heat-fused layer between the laminates.

9. The method of claim 8 wherein the expansion ratios of the two cured foamed sheets are equal to each other.

10. The method of claim 8 wherein the expansion ratios of the two cured foamed sheets are different from each other.

11. The method of claim 8 wherein an embossed pattern is formed on the outside surface of at least one of the surface skin layers simultaneously with the extrusion-laminating step.

12. The method of claim 8 wherein a decorative outside layer is bonded to the outside surface of at least one of the surface skin layers simultaneously with the extrusion laminating step.

13. The method of claim 8 wherein fibers are implanted in the outside surface of at least one of the surface layers before the facing two surfaces are melted and bonded.

* * * * *

UNITED STATES PATENT AND TRADEMARK OFFICE
CERTIFICATE OF CORRECTION

PATENT NO. : 4,721,643

DATED : January 26, 1988

INVENTOR(S) : Hiroshi Harayama, et al.

It is certified that error appears in the above-identified patent and that said Letters Patent is hereby corrected as shown below:

On the cover sheet, line [30], delete "61-19192" and insert therefor -- 61-16192 --.

Signed and Sealed this

Sixth Day of September, 1988

Attest:

DONALD J. QUIGG

Attesting Officer

Commissioner of Patents and Trademarks